US010210027B1

(12) United States Patent
Rohde et al.

(10) Patent No.: US 10,210,027 B1
(45) Date of Patent: Feb. 19, 2019

(54) CLUSTER MANAGEMENT

(71) Applicant: EMC Corporation, Hopkinton, MA (US)

(72) Inventors: Henning Rohde, Seattle, WA (US); Sunil V Soman, Seattle, WA (US); Surinder P Singh, Bellevue, WA (US); Hui Li, Bellevue, WA (US); Carl R Erhard, Holden, MA (US); Shane Sullivan, Milford, MA (US); Yasmine Alperovitch, Hopkinton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 242 days.

(21) Appl. No.: 15/196,939

(22) Filed: Jun. 29, 2016

Related U.S. Application Data

(63) Continuation-in-part of application No. 14/857,177, filed on Sep. 17, 2015, now Pat. No. 9,860,311.

(51) Int. Cl.
*G06F 15/173* (2006.01)
*G06F 9/54* (2006.01)

(52) U.S. Cl.
CPC .............. *G06F 9/541* (2013.01); *G06F 9/547* (2013.01)

(58) Field of Classification Search
CPC .................................. G06F 9/541; G06F 9/547
See application file for complete search history.

(56) References Cited

U.S. PATENT DOCUMENTS

| 8,458,717 | B1 | 6/2013 | Keagy et al. |
|---|---|---|---|
| 8,706,798 | B1 | 4/2014 | Suchter et al. |
| 8,874,705 | B1 | 10/2014 | Satish |
| 9,860,311 | B1 | 1/2018 | Rohde et al. |
| 2003/0009511 | A1 | 1/2003 | Giotta et al. |
| 2004/0015978 | A1* | 1/2004 | Orii ..................... G06F 11/3404 718/105 |
| 2005/0005012 | A1 | 1/2005 | Odhner et al. |
| 2005/0188191 | A1* | 8/2005 | Yoshida ................ G06F 9/5011 713/1 |
| 2005/0251567 | A1 | 11/2005 | Ballew et al. |
| 2006/0173984 | A1 | 8/2006 | Emeis et al. |
| 2007/0233843 | A1 | 10/2007 | Frey-Ganzel et al. |
| 2007/0294197 | A1 | 12/2007 | Jackson |
| 2010/0257137 | A1* | 10/2010 | Escribano Bullon ...................... G06F 17/30581 707/623 |
| 2011/0047405 | A1 | 2/2011 | Marowsky-Bree et al. |
| 2013/0067267 | A1 | 3/2013 | Tamhane et al. |

(Continued)

OTHER PUBLICATIONS

Ex Parte Quale Action dated Jul. 10, 2017 for U.S. Appl. No. 14/857,177; 6 Pages.

(Continued)

*Primary Examiner* — Mohamed A Wasel
(74) *Attorney, Agent, or Firm* — Daly, Crowley, Mofford & Durkee, LLP

(57) ABSTRACT

A computer implemented method, system, and computer program product comprising computing at a cluster manager and node manager a realized goal state by examining a goal state stack for a set of nodes of a cluster, determining differences between the realized goal state and the actual state of the cluster and nodes, and based on the differences, determining a set of actions to align the actual state with the realized goal state.

14 Claims, 19 Drawing Sheets

(56) References Cited

U.S. PATENT DOCUMENTS

| | | | |
|---|---|---|---|
| 2015/0026336 A1* | 1/2015 | Suchter | G06F 9/5038 |
| | | | 709/224 |
| 2015/0121134 A1 | 4/2015 | Wipfel et al. | |
| 2015/0199253 A1* | 7/2015 | Sprague | G06F 11/3419 |
| | | | 709/224 |
| 2015/0350318 A1 | 12/2015 | Van Assche et al. | |
| 2016/0182378 A1* | 6/2016 | Basavaraja | H04L 45/745 |
| | | | 370/235 |
| 2016/0191611 A1 | 6/2016 | Srinivasan et al. | |
| 2016/0191613 A1 | 6/2016 | Srinivasan et al. | |

OTHER PUBLICATIONS

Response to Ex Parte Quale Action dated Jul. 10, 2017 for U.S. Appl. No. 14/857,177; Response filed on Aug. 7, 2017; 12 Pages.
Notice of Allowance dated Aug. 25, 2017 for U.S. Appl. No. 14/857/177; 10 Pages.

* cited by examiner

GOAL STATE 1
OWNER "FABRIC LIFESTYLE"
430

FIG. 4

GOAL STATE 1
OWNER "FABRIC LIFESTYLE"
630

FIG. 6

GOAL STATE 2
VERSION: 1.1
DISKS 80x 1TB
1635

FIG. 16

CLUSTER MANAGEMENT

BACKGROUND

Typically, managing and operating distributed applications across a cluster of machines is notoriously hard to do correctly and without unintended disruptions. Generally, different operations aspects collide in practice, such as upgrading the application while one machine is down and taking too many instances down at the same time. Typical solutions fall into two camps: remote execution (imperative) systems and instance count (declarative) systems. Conventionally, remote execution systems are usually built around management of templates of an underlying scripting language. Usually, instance count systems are usually built around containers or similar packaging and target stateless applications.

SUMMARY

A computer implemented method, system, and computer program product comprising computing at a cluster manager and node manager a realized goal state by examining a goal state stack for a set of nodes of a cluster, determining differences between the realized goal state and the actual state of the cluster and nodes, and based on the differences, determining a set of actions to align the actual state with the realized goal state.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 4 is a simplified illustration a goal state in normal mode, in accordance with an embodiment of the present disclosure;

FIG. 6 is a simplified illustration a node exiting from maintenance mode, in accordance with an embodiment of the present disclosure;

FIG. 16 is a simplified illustration a stack where version 1 has been removed from the stack (upgrade complete), in accordance with an embodiment of the present disclosure;

RELATED APPLICATIONS

Figure 1:
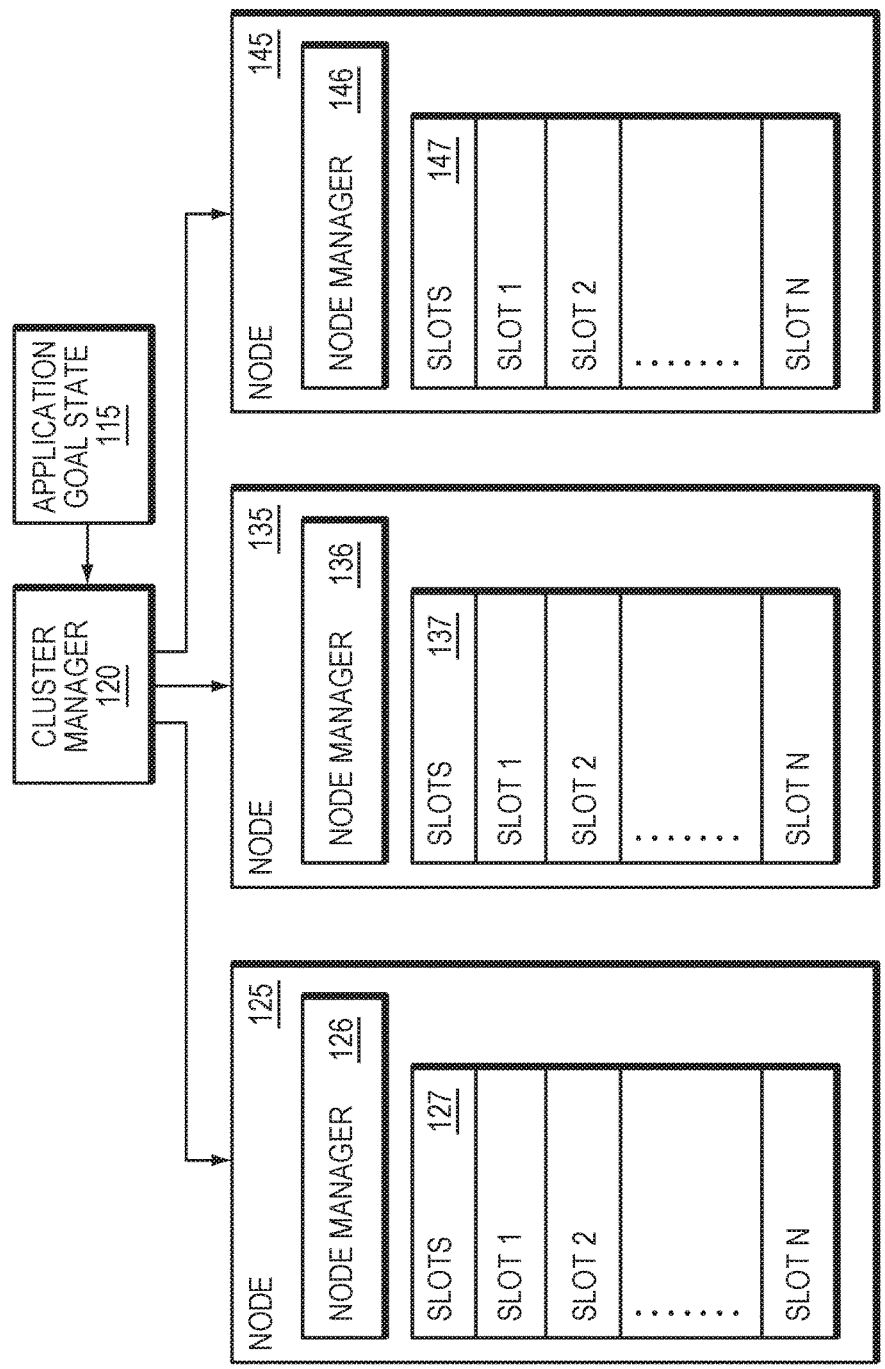
FIG. 1 is a simplified illustration a cluster manager and nodes, in accordance with an embodiment of the present disclosure.

This Application is a Continuation-in-Part of U.S. patent application Ser. No. 14/857,177 entitled "Cluster Management of Distributed Applications" filed on Sep. 17, 2015.

DETAILED DESCRIPTION

Typical remote execution (imperative) systems and instance count (declarative) systems exhibit a set of problems. Conventional systems may have a big step problem: where the system performs a series of operations without preserving intrinsic invariants. Typically, conventional systems may break applications that maintain quorum, either on disk or in-memory, and require application-specific coordination for migration, shutdown or other operations. For example, generally if a Zookeeper ensemble must be moved from 5 nodes to 5 other nodes under traffic, careful application-specific coordination must be performed to not lose quorum and/or data.

Another problem conventional systems may have is a delegation problem. Even for conventional systems that address the big step problem, often there is no clear separation of concerns between system coordination logic and application-specific coordination logic. In conventional systems, it may be difficult and fragile to add or modify application-specific coordination logic. In conventional systems, operations may be inherently at odds when such coordination is required, such as a node-level operation (vertical) vs. an application-level operation (horizontal), become particularly error-prone to implement and maintain.

A further problem with conventional systems may be transitional uncertainly. In a convention system, the system does not expose or represent the actual "in-transition" state during long cluster-wide management operations. In conventional systems, this lack of exposure can make it very difficult to detect—let alone correct—if the overall operation is stuck, slow or otherwise not succeeding (short of looking at logs or similar). In conventional systems, if an operation does not succeed or fail in the expected time, often the only real option is to "wait longer" before diving into actual debugging.

A still further problem with conventional systems may be of grace. In a conventional system, the system performs necessary disruptive operations, which become externally observable as errors. In a conventional system, for applications that must maintain an SLA around bandwidth, uptime, or IOPS, for example, coordination becomes even more important. In conventional systems, application instances may need to drain traffic, reprogram load balances or transfer responsibilities before certain operations, such as upgrade, can be performed. In a conventional system, failure to do so may show up as client errors that—even if transient and recoverable—are completely avoidable.

Conventional systems may experience a manual override problem. In conventional systems, a part of an application, say a specific machine for trying out a hotfix, must have custom configuration/setup, but the conventional system may not allow this set up. Typically, an operators must resort to make the desired changes out-of-band and ignore/block any warnings or (mistakenly) corrective actions from the conventional system.

Conventional systems may also experience an undo problem. In a conventional system, it is often difficult and error-prone to revert a manual override. In a conventional system, if a manual override is performed for an investigation, it must be reverted afterwards for the system to re-maintain application health. Typically, an operator must remember the original state and re-set that state and otherwise unwind the manual changes.

Conventional systems may also experience a complexity problem. In a conventional system, the system does not readily support multiple operations at the same time or in imperfect conditions, e.g., upgrade while one node is under manual override, or a node is down during an application upgrade and then comes back up and not run old code. In conventional systems, in each case, each possibility in the operations cross-matric must be specifically coded for to not conflict with others. In conventional systems, at scale, there may be a disruptive operation in progress in some part of the cluster.

In certain embodiments, techniques to manage distributed applications in a cluster of nodes may be described. In some embodiments, techniques may provide a flexible yet compact representation of both transitional and stationary states with precise ownership and may provide unified schemes for controlled deviations and operations that allow delegation and coordination through application negotiation. In some embodiments, a role may be a sub-component of an application (service) that may run in a virtualized environment or a container. In other embodiments, an application (service) may include of one or more roles that interact with each other. In one embodiment, a role may be user-defined.

In some embodiments, the current disclosure may enable computing a desired state of a cluster and nodes by computing a realized goal state for a stateful application over a transitional representation embodied by a goal state stack comprising of goal states. In certain embodiments, the current disclosure may enable determining differences between the realized goal state and the actual state of the cluster and nodes, and based on the differences. In some embodiments, the current disclosure may enable determining a set of actions to align the actual state with the realized goal state. In many embodiments, the current disclosure may enable performing controlled deviations to the goal state of stateful applications for service rollback, suspension, maintenance mode, upgrade, manual override, cluster manager upgrade and co-existence with third-party cluster managers.

In certain embodiments, the current disclosure may enable a flexible yet compact representation of both transitional and stationary states with precise ownership. In many embodiments, the current disclosure may enable unified schemes for controlled deviations and operations that may allow delegation and graceful coordination through application negotiation.

In many embodiments the current disclosure may enable a distributed infrastructure system to deploy, manage, and upgrade the control lifetime of complex distributed applications. In some embodiments, each application may have a role. In certain embodiments a role or service may be interdependent and may require consistency of state. In further embodiments, a goal state may include ownership information. In many embodiments, a goal state may have current state information as well as a historical information. In certain embodiments, a goal state may encode goals. In further embodiments, a goal state may describe an application. In many embodiments, a goal state may outline resource and parameter details to prepare for an upgrade. In some embodiments, when maintenance mode is desired, an empty goal state may be pushed. In most embodiments, a goal may be popped off a stack.

In some embodiments, the current disclosure may enable interfacing with and negotiating with one or more applications. In certain embodiments, libraries and APIs may be provided for application development. In many embodiments, a library and API may enable an application to be asked whether it is in a state that can be restarted. In other embodiments, an application may be able to negotiate a time when it is in an acceptable state to be taken down or stopped.

In certain embodiments, a distributed "application" may consist of a set of "roles" each with some desired cardinality and affinity/anti-affinity (one instance per rack, one instance per node, etc). In some embodiments, a cluster manager may take this "application goal state" and maps each role instance to a "slot" on a node, where an agent manages the slots. In many embodiments a slot may consist of one or more of the following: (a) a goal state for local resources: a process or container that should be running, disks that may be made available, ports that should be open, etc., i.e., the desired state (b) an actual state (the currently observed state); and (c) a health value (GOOD, DEGRADED, SUSPECT, BAD, INIT). In some embodiments, a cluster manager may roll up the slot states and health into an application-level actual state and health. In certain embodiments an agent, as well as a cluster manager, may compute actions from a delta between the goal state and the actual state. In certain embodiments, execution of these actions may attempt to change the real state of the cluster/machine (shell commands may be run, system calls may be made), which in turn may be observed by a system as actual state for further action generation. In particular embodiments, an implicitly or explicitly failed action may robustly be re-tried as part of a subsequent delta computation.

In certain embodiments, a slot may correspond to a service. In many embodiments, a slot may correspond to a service that runs on a node. In most embodiments, there may be several services on a node. In some embodiments, there may be several slots on a node. In many embodiments, there may be a set of slots per node. In most embodiments, a slot may have an owner and a stack of goals. In some embodiments, a slot for a service may be referred to herein as a "service slot" or slot for a service.

In certain embodiments, a node may have a node manager. In many embodiments, a node manager may be a process that runs on a node. In some embodiments, a node manager may determine the goal state for the node. In most embodiments, a cluster manager may determine a goal state across nodes. In many embodiments, a node manager may contain goal states. In certain embodiments, a node manager may contain slots. In some embodiments, a node manager may determine a state of a node by examining goal states.

In some embodiments of the current disclosure, structure and semantics of the goal states of notably the slot goal state may enable seamless state changes. In some embodiments, a slot goal state may be a "stack" of compute/storage/host resource goals including a special "empty" goal indicating that nothing should be running, with a reason indicating why. In certain embodiments, a top compute may be a process/container that is supposed to be actively running. In some embodiments, other processes may be placed in standby. In many embodiments, the current disclosure may enable representation of what previously ran as well as what is about to run. In certain embodiments, keeping precise historical and upcoming information may solve a big step problem and a transitional uncertainty problem.

In some embodiments, an agent may compute a "realized goal state" (RGS) from a stack, which specifies what the actual state should look like. In certain embodiments, a realized goal state may be a top of a stack for compute and the union of storage and host resources. In certain embodiments, a realized goal state may indicate that a slot may be suspended—without any resources being deallocated (e.g, disks)—by pushing an empty goal to a stack. In most embodiments, resuming an application in a suspended state may be performed by popping the stack again. In certain embodiments a suspend and resume may solve an undo problem.

In most embodiments, each item in a state may include an owner. In certain embodiments, an owner may include an application identity and a role or instance. In many embodiments, a role or instance may be voluntary, which may enable careful coordination, overrides and controlled delegation. In certain embodiments, a cluster manager may manage slots that it owns. In particular embodiments, operators may manually suspend a slot and set themselves as the owner. In certain embodiments, the ability to change ownership of a slot may solve a delegation problem, a manual override problem, and a grace problem.

In many embodiments, a realized goal state (RGS) and actions may be periodically re-computed. In certain embodiments a goal state may be externally updated. In most embodiments, an action in flight may be ignored. In other embodiments, lost or failed actions may be retried after a delay. In further embodiments, an action in flight may be observable in the system.

In certain embodiments, if a RGS changes, health may be set to INIT to indicate a goal and actual state diverge intentionally. In many embodiments, health may move to another state as the resources changes either succeed or fail. In most embodiments, a periodic test may ensure that health moves to SUSPECT if there has been no progress for too long, making INIT a reliably transient state. In most embodiments, a purpose of INIT (over SUSPECT or DEGRADED) may be to indicate planned vs. unplanned divergence. In certain embodiments, an INIT state may solve a transitional uncertainty problem.

In many embodiments, an action may alter resources disruptively may be preceded by application/service negotiation where the application may acknowledge/accept the action and may delay the action if necessary. In certain embodiments, a negotiation can be bypassed by a manual override. In most embodiments, a manual override may be important in cases where compute is desired to be suspended or stopped, but critical resources may need to be replicated or traffic may need to be drained and the load balanced. In certain embodiments override may solve a grace problem.

In many embodiments, the current disclosure may enable reversion of change. In most embodiments, a push/pop nature of a goal state stack may make it easy to safely make one or more changes and as appropriate reverse the changes. In some embodiments, non-stack operations may be possible, such as insertion at second position and swapping first and second positions. In further embodiments, the ability to revert may make deviations stand out and may allow retention of the transitional history. In some embodiments, a history may be stored in a goal state stack. In many embodiments, a history may denote what applications have run, what version applications have run, and/or what actions have been taken by the node. In certain embodiments, the ability to revert may include leaving the old version in the inactive part of the goal state until one is confident it will not be necessary to roll back. In many embodiments, a union semantics of non-compute resources may also mean that the system may hold on to ports and other otherwise dropped resources that would be needed for a successful rollback.

In some embodiments, the current disclosure may enable suspension. In many embodiments, an "empty" goal state may enable services to be suspended without losing information about what was running before the suspend command.

In certain embodiments, the current disclosure may enable a maintenance mode. In some embodiments, a node may be transitioned into maintenance mode, which may suspend services and may stop accepting new provision requests. In many embodiments, a reason value on an empty goal state may enable an un-suspend if the suspension was due to maintenance. In many embodiments, a maintenance mode may utilizes unified semantics of goal state stack and ownership. In some embodiments, a system may add cluster-level logic to prevent taking too many nodes into maintenance mode at the same time (unless forced). In other embodiments, a system may ensure that a desired version of software is about to run when the service is taking out of maintenance mode. In certain embodiments, for example, if a node is under maintenance during one or multiple upgrades of the cluster it may be necessary to upgrade that node on completion of maintenance mode.

In many embodiments, the current disclosure may enable applications to be upgraded in a coordinated fashion. In particular embodiments, by adding a new version of software at the end of a goal state, compute actions may not change but new resources may be provisioned without disrupting the running application—such as opening new firewall ports. In many embodiments, when new resources are in place, it may be possible to swap a 1st and 2nd stack item positions to change the compute part. In certain embodiment, the current disclosure may enable an inline upgrade. In some embodiments, an old compute may be stopped and a new compute may be started with unified resources. In most embodiments, control may be maintained throughout. In further embodiments, rollback may be possible by swapping back the 2 goal stack nodes. In further embodiments, once rollback is no longer relevant, a 2nd position may be removed and resources that applied only for the old version may be relinquished. In certain embodiments, delegated upgrade may work in a similar same way, but delimited by an in-place ownership capture of a top of a stack.

In most embodiments, the current disclosure may enables multiple control/monitor applications that change cluster management to co-exist and be active if they are given ownership of a monitored slot. In most embodiments, this may enable highly robust systems where the voluntary instance part of ownership is passed for the purpose of upgrading the (possibly complex) control application. In many embodiments, a new version may be brought up completely, but in a passive mode, before the old version may be taken down. In further embodiments, it may be possible to statically or dynamically partition the control responsibility for large systems.

In most embodiments, the current disclosure may enable manual override. In certain embodiments, ownership in a goal stack of a system may enable manual override as a first class primitive. In most embodiments, a manual cluster control/monitor tool may acquire ownership of application management. In certain embodiments, if one pushed a copy of the top state node with just the ownership changes, it may be able to revert to the previous ownership. In certain embodiments, a special owner "root" may be reserved for operators and enable taking control and ownership. In most embodiments, the current disclosure allows for reliable management and operation of stateful distributed systems under imperfect, real-life conditions at scale.

In many embodiments, ownership may be part of a goal state. In certain embodiments, it may be possible to give up ownership using a goal state. In most embodiments, a goal state mechanism may co-exist with other cluster or control managers in a distributed system. In some embodiments, a goal state may be used to update a control manager. In certain embodiments, a new version of a cluster manager may be initialized or bought up in a passive manner before an old version is taken down. In some embodiments, a new version may be placed in a goal state stack under an old version. In many embodiments, an old version may be popped off the stack leaving a new version to take over.

In certain embodiments, an application goal state may describe an application in a cluster. In many embodiments, a cluster may include nodes. In certain embodiments, a cluster manager may map an application goal state to slots on one or more nodes. In certain embodiments, a slot may represent an instance of a particular service that should run on the node. In most embodiments an application may consist of multiple instances of a service or service. In an embodiment, a web application may include of a web server, a database or storage back end, and a load balance. In certain embodiments, there may be multiple instances of each service in a cluster. In certain embodiments, a slot may represent an instance. In many embodiments, a node may have a set of slots each with a stack of goal states. In most embodiments, a goal state may describe an instance of a services.

In many embodiments, a realized goal stated (RGS) may be computed. In most embodiments, a RGS may describe what should run on a node and may be a computation of the goal state stack. In certain embodiments, a RGS may be compared with an actual or observed goal state to compute differences or a delta. In some embodiments, actions may be generated based on the delta or differences. In most embodiments, generated actions may bring the observed goal state in line with an RGS. In many embodiments, the health of a slot or application may be computed. In most embodiments, a health may be computed at a node level. In many embodiments, a health may be computed at a cluster level. In certain embodiments, one or more different steps may be repeated.

In some embodiments, a node may be placed in a maintenance mode by adding a new goal or slot to the top of the node's stack. In many embodiments, a node in maintenance mode may enable an ownership change. In certain embodiments, a maintenance mode may be exited by popping a goal state of a stack of a node. In other embodiments, upgrading a node by adding a state to a top of a stack of a node may enable the node to roll back to an earlier state by popping the new state of the stack. In further embodiments, upgrading to a new node state or configuration may be enabled in the background by adding a goal state under a current goal state in a stack in a node.

In certain embodiments, a cluster may have one or more nodes. In some embodiments, a node may have a goal state stack. In many embodiments, a goal state stack may have a set of goal states. In most embodiments, a goal state may include a service owner, service definition, and service version.

In certain embodiments, a cluster manager may compute a realized goal state. In many embodiments, a realized goal state may be determined by examining goal state stacks for a set of nodes. In some embodiments, an actual goal state may be determined by examining a goal state stack for a set of nodes. In many embodiments, differences between a realized goal state and actual state may be determined. In most embodiments, a set of actions may be determined to align an actual goal state to a realized goal state.

In certain embodiments, a set of actions may include a set of goal states enabled to be deployed to a set of nodes. In many embodiments, a set of action may change an actual state to a realized goal state for a set of nodes. In some embodiments, a goal state stack may include a history for one or more services for a node. In certain embodiments, a health of a service may be determined by comparing an actual state with a realized goal state.

In certain embodiments, ownership of a goal state at a top of a stack may be changed of a node is changed to voluntarily give up control of a service to enable manual override.

In other embodiments, different services may have different owners to allow co-existence with third-party cluster management systems in a statically or dynamically partitioned cluster. In further embodiments, a goal state corresponding to a new version of a cluster manager may be inserted onto a goal state stack to allow the new version to be bootstrapped before the goal state for the old version is popped off the stack.

Refer now to the example embodiment of FIG. 1, which illustrates a cluster manager and nodes. In the example embodiment, cluster manager 120 computes application goal state 115 by examining the goals or stack 122, 137, and 147 of Nodes 125, 135 and 145. Application goal state 115 describes an application in the cluster made up of nodes 125, 135, and 145. In this embodiment cluster manager 120 maps or converts application goal state 115 into node level slot goal states. In certain embodiments, cluster manager may compute an application goal state by examining a computed goal state calculated by a node manager on respective nodes in a cluster.

Figure 2:
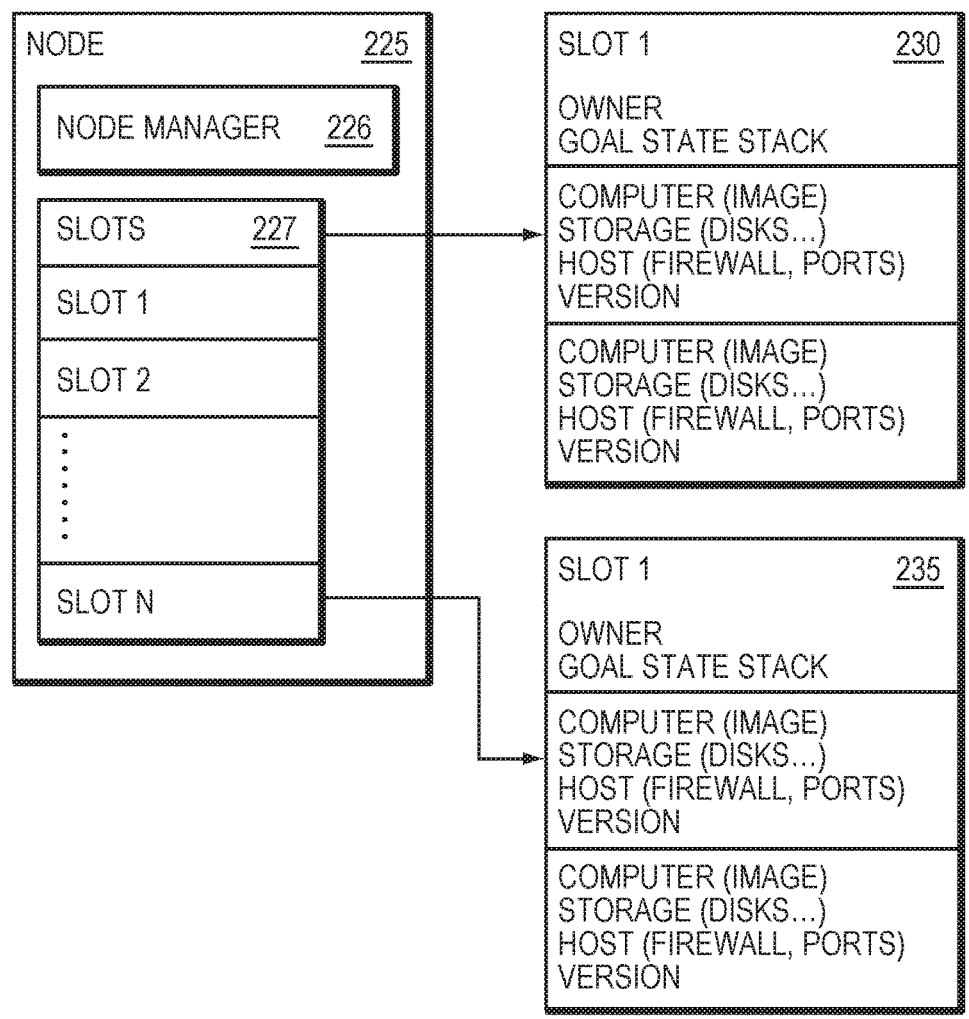
FIG. 2 is a simplified illustration a node with set of slots representing a goal state stack, in accordance with an embodiment of the present disclosure.

Refer now to the example embodiment of FIG. 2. In the example embodiment of FIG. 2, node 225 has node manager 226, which has slots 227, which includes slots 1 to slots N. Slot 1 230 represents an example slot and has an Owner, computer (image), storage (disks), host (firewall, ports). Slot N 235 represents an alternative slot and has an Owner, computer (image), storage (disks), host (firewall, ports).

In many embodiments, a collection or stack of goal states may describe instances of services. In some embodiments, a collection or stack may represent an (observed) or actual state of the node and may note storage an open ports. In most embodiments, a health of a slot may represent the state of the application such as initializing, good, bad, or a suspected state.

Figure 3:
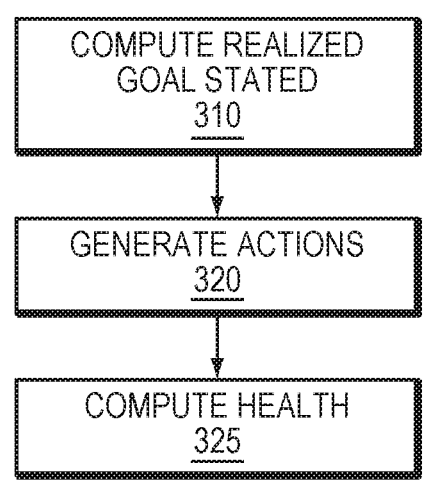
FIG. 3 is a simplified method for computing a realized goal state, in accordance with an embodiment of the present disclosure.

Refer now to the example embodiments of FIGS. 1 and 3, which illustrate a computing a realized goal state. Cluster manager 120 may computer a realized goal state 115 (RGS) (step 310). In FIG. 1, node manager 126 calculates a goal state for node 125, node manager 136 calculates a goal state for node 135, node manager 146 calculates a goal state for node 145. In FIGS. 1 and 3 RGS 115 represents a computations over the goal state stacks 127, 137, and 147 of nodes 125, 135, and 145. RGS 115 is compared with the actual (observed) state to compute a delta. Based on the delta, actions are created to bring the actual (observed) state in line with the RGS 115 (step 320). A health of the slots or of an application is determined at the node level for each node 125, 135, and 145. A health of the slots or of an application is determined at the cluster level across nodes 125, 135, and 145 (step 325).

Figure 5:
FIG. 5 is a simplified illustration a node entering into a maintenance mode, in accordance with an embodiment of the present disclosure.
Figure 6:
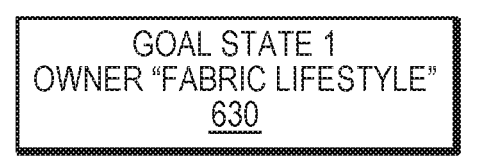
Figure 7:
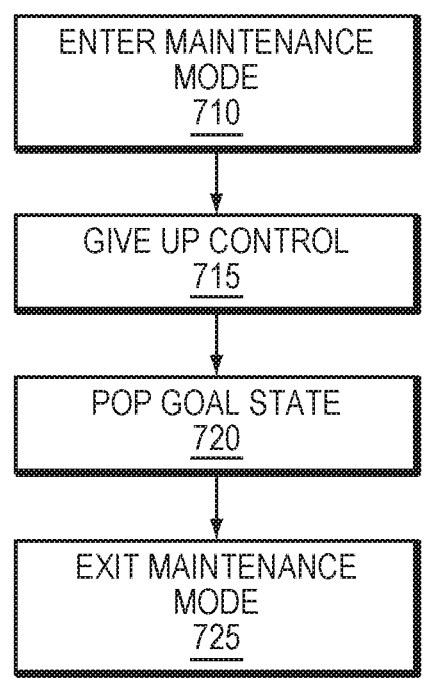
FIG. 7 is a simplified method for entering and exiting a maintenance mode, in accordance with an embodiment of the present disclosure.

Refer now to the example embodiment of FIG. 4, which represents a goal state in normal mode. In this embodiment, goal state 1 430 is owned by fabric lifecycle. Refer now the example embodiments of FIG. 5 and FIG. 7, which represents the node entering into a maintenance state. In these embodiments, the node enters maintenance mode (step 710) when goal state 2 admin 535 is added to the goal stack. In these embodiments, a cluster manger or fabric lifestyle gives up control (step 715) to the ownership change. In the example embodiments of FIG. 5 and FIG. 7, the top goal state 535 has an owner of admin. Refer now to the example embodiments of FIG. 6 and FIG. 7, which represent an exiting of maintenance mode. Goal state 2 535 with owner admin of FIG. 5 has been popped off (step 720) the stack leaving goal state 1 630 with owner fabric lifestyle causing it to exit maintenance mode (step 725).

Figure 8:
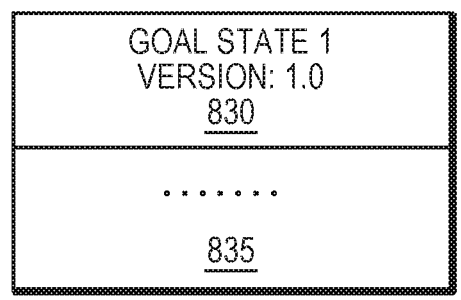
FIG. 8 is a simplified illustration a goal state in with Version 1.0 on the top of the stack, in accordance with an embodiment of the present disclosure.
Figure 9:
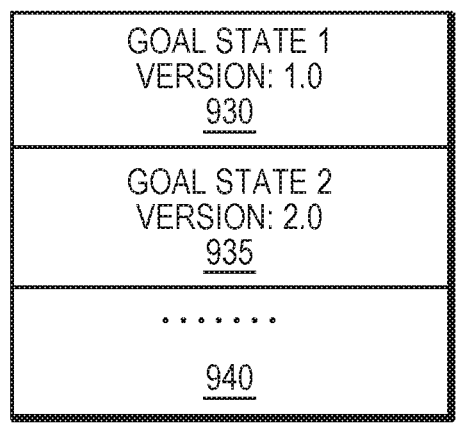
FIG. 9 is a simplified illustration a goal state in with Version 2.0 appended to the stack and Version 1.0 at the top of a stack, in accordance with an embodiment of the present disclosure.
Figure 10:
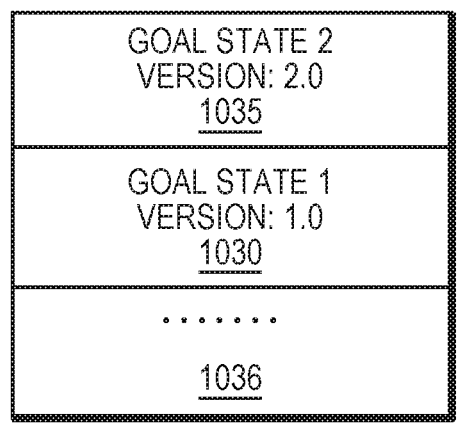
FIG. 10 is a simplified illustration a goal state in with Version 2.0 on the top of the stack and Version 1.0 as second in the stack to enable optional rollback, in accordance with an embodiment of the present disclosure.
Figure 11:
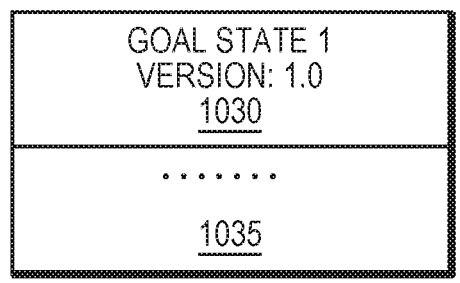
FIG. 11 is a simplified illustration a goal state in with Version 1.0 on the top of the stack and Version 2.0 has been popped from the stack (rollback), in accordance with an embodiment of the present disclosure.

Refer now to the example embodiments of FIGS. 8-11, which represent upgrading to a new version and rolling back to the old version. In the example of FIG. 8, goal state 830 with version 1 is on the top of the stack. In FIG. 9, Goal state 2 935 with version 2 has been added to the stack (step 1110) and goal state 1 930 with version 1.0 exists under the stack. A determination is made if there needs to be a rollback (step 1115). If a rollback is needed, Goal state 2 935 is popped of the stack returning the system to goal state 1 1030 with version 1.0 (step 1120).

Figure 12:
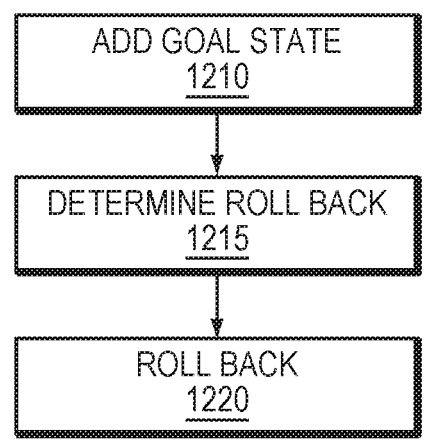
FIG. 12 is a simplified method for rolling back an upgrade, in accordance with an embodiment of the present disclosure.
Figure 13:
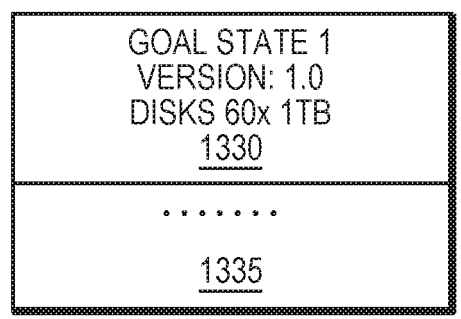
FIG. 13 is a simplified illustration of a node with version 1 of a goal state, in accordance with an embodiment of the present disclosure.

Refer now to the example embodiments of FIGS. 12-15 which represent a non-disruptive upgrade. FIG. 12 represents steady state 1230 of a node with version 1 of a goal state. FIG. 13 represents the addition of goal state 1335 with version 1.1 with new requirements under the goal state 1330 with version 1 (step 1510). In this embodiment, the new goal state is inserted at the bottom of the stack. In this embodiment, the realized goal state computation will reflect an addition 20 disks of storage in the next version change (80 disks at 1 TB instead of 60 disks at 1 TB). Actions are deployed to get the additional 20 disks ready (step 1515). This change may take time but the application is not disrupted as the current goal state is still on the top of the stack.

In many embodiments, an application may be notified of a pending upgrade and a current goal state may remain at the top of the stack until an acknowledgement is received from the application. In certain embodiments, an application may take steps to react to a pending upgrade, such as making additional replicas of the data on the node. In most embodiments, when an application replies with a positive acknowledge, the old goal state may be popped off a stack.

Figure 14:
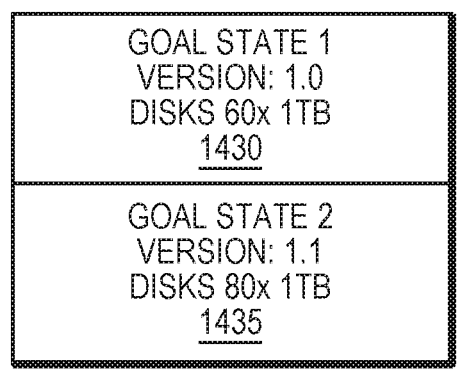
FIG. 14 is a simplified illustration an addition of a goal state with version 2 to the stack under the goal state of version 1, in accordance with an embodiment of the present disclosure.
Figure 15:
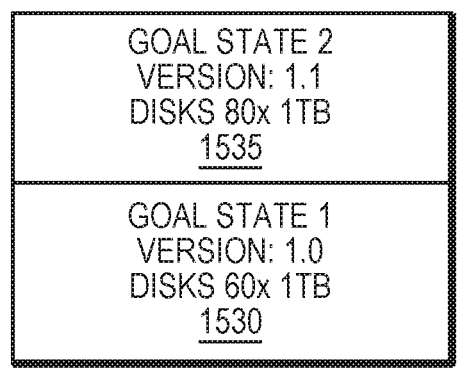
FIG. 15 is a simplified illustration a stack where version 1 and 2 have been swapped in the stack to enable optional rollback, in accordance with an embodiment of the present disclosure.
Figure 17:
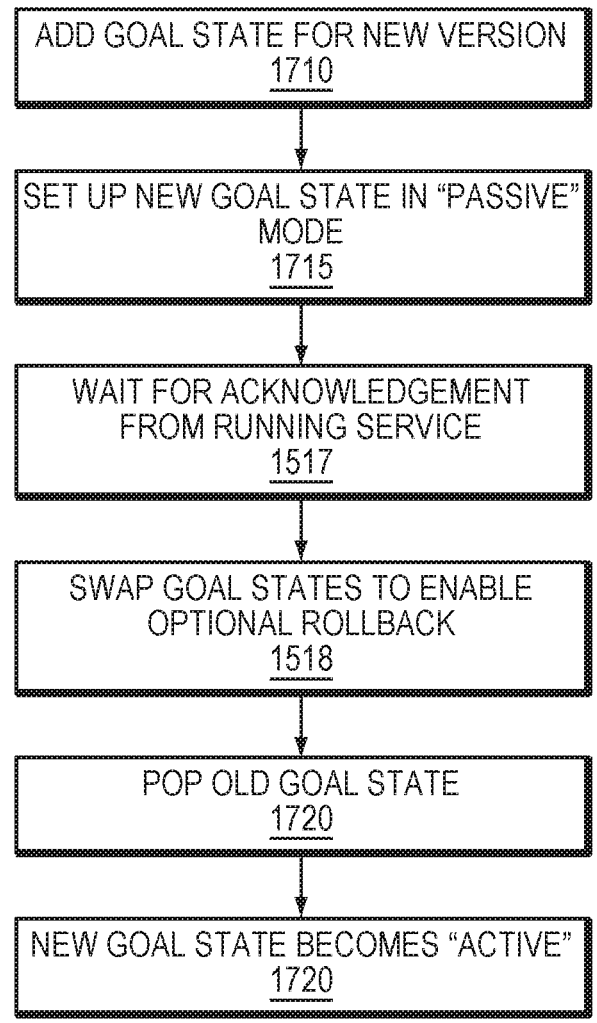
FIG. 17 is a simplified method for a non-disruptive upgrade, in accordance with an embodiment of the present disclosure.
Figure 18:
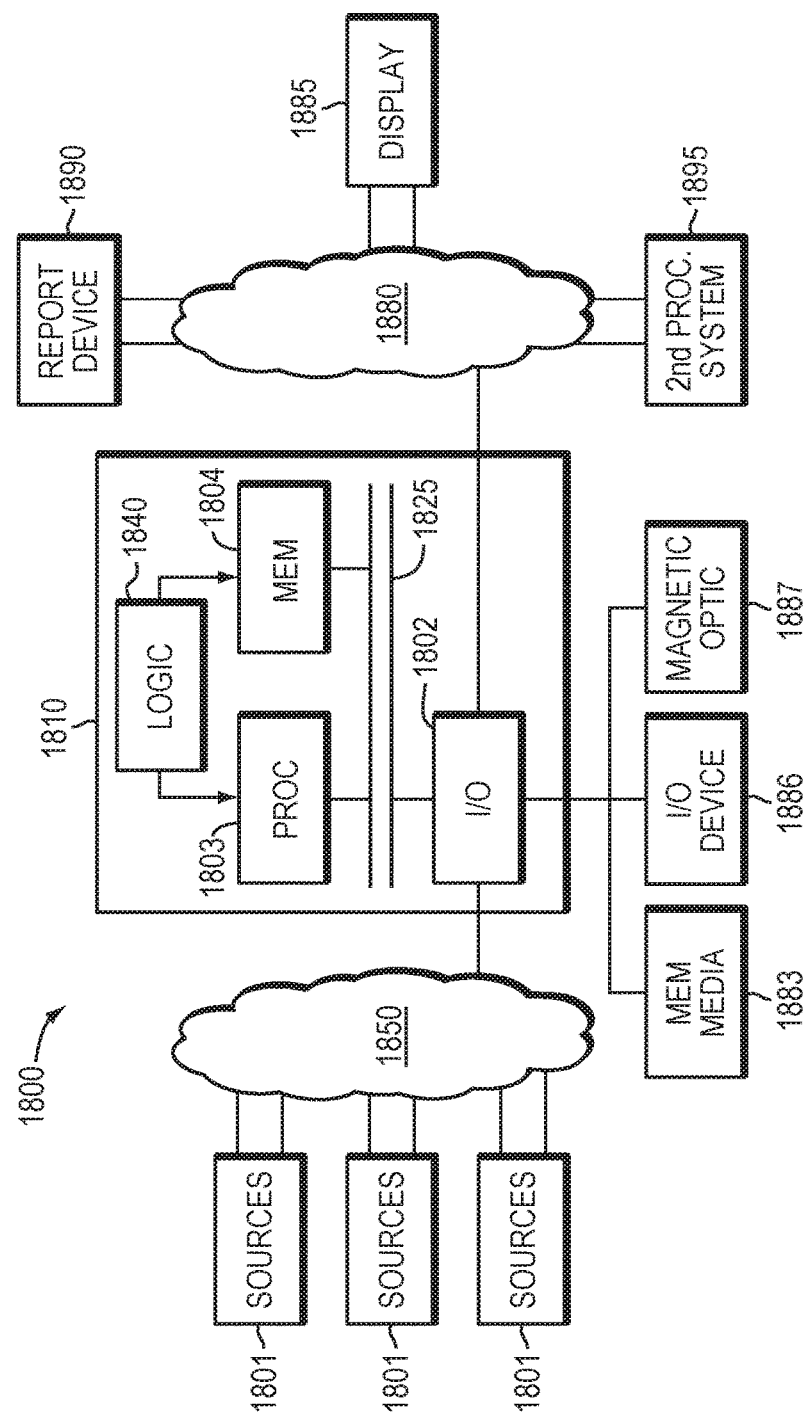
FIG. 18 is an example of an embodiment of an apparatus that may utilize the techniques described herein, in accordance with an embodiment of the present disclosure.

Refer now to the example embodiment of FIG. 14. The goal state 1 version 1.0 1330 has been popped off the stack (step 1520) leaving goal state 1435 with version 1.1 on the top of the stack. As the resources for version 1.1 were allocated before goal state version 1.0 was popped of the stack, there is no disruption to get the new resources. In many embodiments, a lower version may be swapped under a newer version, in certain embodiments this step may be omitted.

Figure 16:
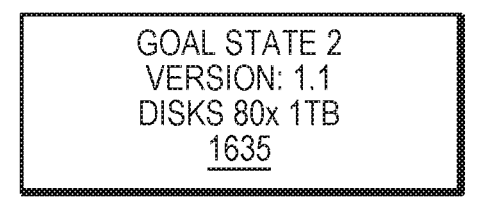
Figure 19:
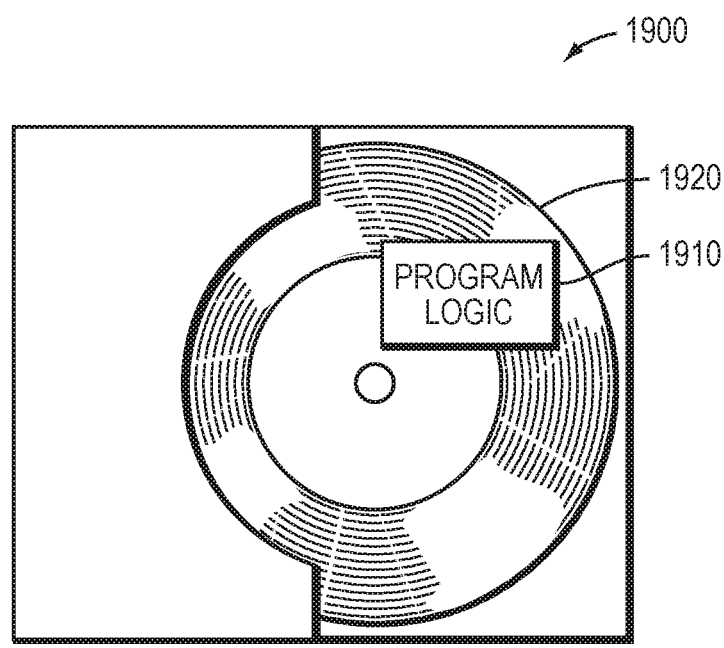
FIG. 19 is an example of an embodiment of a method embodied on a computer readable storage medium that may utilize the techniques described herein in accordance with an embodiment of the present disclosure.

The methods and apparatus of this disclosure may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 16, the machine becomes an apparatus for practicing the disclosure. When implemented on one or more general-purpose processors, the program code combines with such a processor 1803 to provide a unique apparatus that operates analogously to specific logic circuits. As such a general purpose digital machine can be transformed into a special purpose digital machine. FIG. 19 shows Logic 1910 embodied on a computer-readable medium 1920 as shown, and wherein the Logic is encoded in computer-executable code configured for carrying out the reservation service process of this disclosure and thereby forming a Computer Program Product 1900. The Logic 1910 may be the same logic 1840 on memory 1804 loaded on processor 1803. The program logic may also be embodied in software modules, as modules, or as hardware modules. The program logic may be run on a physical or virtual processor. The program logic may be run across one or more physical or virtual processors.

The logic for carrying out the method may be embodied as part of the system described below, which is useful for carrying out a method described with reference to embodiments shown in, for example, FIGS. 3, 7, 12, and 17. For purposes of illustrating the present disclosure, the disclosure is described as embodied in a specific configuration and using special logical arrangements, but one skilled in the art will appreciate that the device is not limited to the specific configuration but rather only by the claims included with this specification.

The scope is limited only by the claims and there are numerous alternatives, modifications, and equivalents. Numerous specific details are set forth in the above description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured. Accordingly, the above implementations are to be considered as illustrative and not restrictive, and the disclosure is not to be limited to the details given herein, but may be modified within the scope and equivalents of the appended claims.

The invention claimed is:

1. A system, comprising:
a cluster having at least a plurality of nodes, each of the plurality of nodes having a respective node manager and a respective set of service slots that includes a slot owner and a goal state stack; and
a cluster manager configured to compute a specified state by examining the goal state stacks of the plurality of nodes, determine differences between the specified state and an actual state of the cluster, and based on the differences, determine a set of actions to align the actual state of the cluster with the specified state,
wherein the set of actions includes a set of goal states, each goal state being inserted into a different one of the goal state stacks of the plurality of nodes,
wherein the pal state stack of any of the plurality of nodes includes a history of at least one service of the node, such that a status of the service may be determined at least in part by comparing the actual state with the specified state,
wherein each goal state includes a service definition and service version, and
wherein the goal states represent non-disruptive upgrades to an application running on the plurality of nodes.

2. The system of claim 1, wherein each of the goal states is inserted into bottom of the goal state stack of a respective one of the plurality of nodes.

3. The system of claim 1, wherein at least one of the goal states represents a maintenance state.

4. The system of claim 1, wherein a set of goal states is popped off from the goal state stacks of the plurality of nodes to revert to a previous state.

5. The system of claim 1, wherein at least one of the goal stacks includes an empty goal state, which when pushed onto the goal state stack of a given one of the plurality of nodes causes the given node to enter into a suspend state.

6. The system of claim 1, wherein ownership of a goal state at a top of a stack of a node is changed to voluntarily give up control of a service to enable manual override.

7. The system of claim 1, wherein different services in the system have different owners to allow co-existence with third-party cluster management systems in a statically or dynamically partitioned cluster.

8. The system of claim 1, wherein a goal state corresponding to a new version of a cluster manager is inserted onto a goal state stack to allow the new version to be bootstrapped before the goal state for an old version is popped off the stack.

9. A computer program product comprising a non-transitory computer readable medium encoded with computer executable program code, which when executed by at least one processor causes the at least one processor to perform the steps of:
computing a specified goal state by examining goal state stacks for a plurality of nodes in a cluster, each goal state stack being stored in a different one of a plurality of nodes;
determining differences between the specified state and an actual state of the cluster;
based on the differences, determining a set of actions to align the actual state of the cluster with the specified state,
wherein the set of actions includes a set of goal states, each goal state being inserted into the respective goal state stack of a different one of the plurality of nodes,
wherein the goal state stack of any of the plurality of nodes includes a history of at least one service of the node, such that a status of the service may be determined at least in part by comparing the actual state with the specified state, and
wherein each goal state includes a service definition and service version, and
wherein the goal states represent non-disruptive upgrades to an application running on the plurality of nodes.

10. The computer program product of claim 9, wherein each of the goal states is inserted into a bottom of a different one of the goal state stacks.

11. The computer program product of claim 9, wherein at least one of the goal states represents a maintenance state.

12. A computer implemented method comprising:
computing a specified goal state by examining goal state stacks for a plurality of nodes in a cluster, each goal state stack being stored in a different one of a plurality of nodes in a cluster;
determining differences between the specified state and the actual state of the cluster;
based on the differences, determining a set of actions to align the actual state of the cluster with the specified state,
wherein the set of actions includes a set of goal states, each goal state being inserted into the respective goal stack of a different one of the plurality of nodes,
wherein the goal state stack of any of the plurality of nodes includes a history of at least one service of the node, such that a status of the service may be determined at least in part by comparing the actual state with the specified state, and
wherein each goal state includes a service definition and service version, and
wherein the goal states represent non-disruptive upgrades to an application running on the plurality of nodes.

13. The method of claim 12, wherein each of the goal states is inserted into bottom of a different one of the goal state stacks.

14. The method of claim 12, wherein the goal states represent non-disruptive upgrades to an application running on the plurality of nodes.

* * * * *